United States Patent

Miller, II et al.

[11] Patent Number: 6,111,895
[45] Date of Patent: Aug. 29, 2000

[54] WIDEBAND TRANSMISSION THROUGH WIRE

[75] Inventors: Robert Raymond Miller, II, Morris Township, Morris County; Jesse Eugene Russell, Piscataway; Richard Robert Shively, Convent Station, all of N.J.

[73] Assignee: AT&T Corp., New York, N.Y.

[21] Appl. No.: 08/858,170

[22] Filed: May 14, 1997

[51] Int. Cl.[7] .............................. H04B 7/216; H04J 13/00
[52] U.S. Cl. ........................ 370/479; 370/342; 370/441
[58] Field of Search .................................. 370/441, 479, 370/286, 290, 291, 203, 204, 206, 208, 335; 455/3.1, 5.1, 6.1; 348/6, 12; 375/257

[56] References Cited

U.S. PATENT DOCUMENTS

| | | | |
|---|---|---|---|
| 4,475,208 | 10/1984 | Ricketts | 370/479 |
| 5,235,615 | 8/1993 | Omura . | |
| 5,363,403 | 11/1994 | Schilling et al. | 370/441 |
| 5,719,852 | 2/1998 | Schilling et al. | 370/479 |
| 5,761,237 | 6/1998 | Petersen et al. | 370/479 |
| 5,793,759 | 8/1998 | Rakib et al. | 370/441 |

FOREIGN PATENT DOCUMENTS

| | | |
|---|---|---|
| WO 85 04298 | 9/1985 | WIPO . |
| WO 95 17046 | 6/1995 | WIPO . |

*Primary Examiner*—Hassan Kizou
*Assistant Examiner*—Hanh Nguyen

[57] ABSTRACT

A method for broadband transmissions through metallic wire in an interference-laden environment. Wideband communication through a wire is achieved in the presence of other wideband signals in the wire or in adjacent wires by applying a modulation schema to the wideband communication signal that forms a signal which is orthogonal or nearly orthogonal to all other signals that are present in the wire, whether directly applied or electromagnetically induced. In accordance with one illustrated embodiment, a CDMA code is applied to the wideband signal that is to be communicated through a given wire, and the code that is employed is orthogonal to the CDMA codes that are applied to other signals that flow through the wire or through other wires which are in the neighborhood of the given wire.

20 Claims, 2 Drawing Sheets

WIDEBAND TRANSMISSION THROUGH WIRE

BACKGROUND

This invention relates to transmission over metallic wire.

In a Plain Old Telephone System (POTS) environment, a twisted copper pair is typically employed to a bandwidth of approximately 4 KHz, but recently several techniques have been created to increase the available bandwidth. These techniques belong to the group of Digital Subscriber Loop modulation techniques, commonly abbreviated as DSL, HDSL, SDSL, ADSL, etc. (xDSL, as a group).

ADSL (Asymmetric Digital Subscriber Line) is among the best known xDSL techniques. Pursuant to a "template" recommended by BELCORE, a low frequency band from 0 to 40 KHz is assigned to a duplex channel that can be used for POTS or ISDN service. The remainder of the allowed bandwidth, from 40 KHz to 1 MHz, is assigned to a unidirectional channel for wideband applications. The original ADSL embodiment utilized a modulation technique developed at Bell Laboratories in the 1960's which employs an array of individual low-rate modulated carriers to convey high-rate information (rather than one modulated carrier with wide sidebands). The technique is computationally intensive so it was basically unused until the advent of powerful signal processing ICs which allowed the use of Fast Fourier Transform and Inverse Fast Fourier Transform signal processors for reception and transmission, respectively. The resulting technique was embodied by ANSI in T1.413-1995 and is known as Discrete Multitone Modulation, or DMT.

The nominally achievable data rate over the wide bandwidth channel ranges from 1.5 to 6.1 Mbps. However in practice, over a multi-pair cable, the rate is substantially smaller. The actual achievable data rates depend on a number of factors, including the length of the copper line, its wire gauge, presence of bridged taps, varying humidity, changes in characteristics over time, and interferences, etc. The interferences come from like signals that are flowing through adjacent wires of a cable, from external sources that are far-removed, such as AM radio transmissions, and from near-by isochronous and asynchronous traffic. What is known is that the XDSL techniques are poorly adapted to deal with such interferences and, therefore, it remains to be seen what actual data rate is achievable in an environment of a cable with many wire pairs that carry isochronous and asynchronous traffic.

SUMMARY

The problems of prior art broadband transmissions through metallic wires have been overcome by shedding the fear of interference from other signals present on the wires. This is achieved by realizing that a transmission medium comprising, illustratively, a cable of wires that commingle their signals through interference is no worse than an air interface. Pursuant to this insight, wideband communication through a wire is achieved in the presence of other wideband signals in the wire or in adjacent wires by applying a modulation schema, or technique, to the wideband communication signal to form a signal that is orthogonal or nearly orthogonal to all other signals that are present in the wire, whether directly applied or electromagnetically induced. In accordance with one illustrated embodiment, CDMA is the schema employed. That is, a CDMA code is applied to the wideband signal that is to be communicated through a given wire, and the code that is employed is orthogonal to the CDMA codes that are applied to other signals that flow through the wire or through other wires which are in the neighborhood of the wire.

DETAILED DESCRIPTION

A metallic wire pair attenuates high frequencies and thus acts as a low-pass filter. Additionally, when it is near another wire pair, it couples some of its signal to the proximate wire by both capacitive and inductive means. Until now, this cross-coupling of signals between wire pairs that are in close coupling proximity to each other has been considered an evil to be overcome. One approach that is conventionally used is to twist each of the wire pairs. The twisting goes a long way toward reducing the interference of an external signal on the signal flowing through each twisted pair.

The notion of trying to reduce induced interference from external sources has been so ingrained in the minds of artisans that no one has stopped to realize that a communication channel comprising a cable of wire pairs, even where substantial interference is present, is no worse than air; and air is a communication medium that has successfully been used in many applications.

With this insight in mind, we realized that any arrangement where a signal is modulated so that it is orthogonal to all other signals can be acceptably employed in an interference-limited cable. This includes frequency division multiplexing, time division multiplexing, CDMA modulation, etc. When two signals are said to be orthogonal, what is meant is that in the course of processing one of the signals, the contribution of the other signal at the output is close to zero even when it is present at the input.

Figure 1:
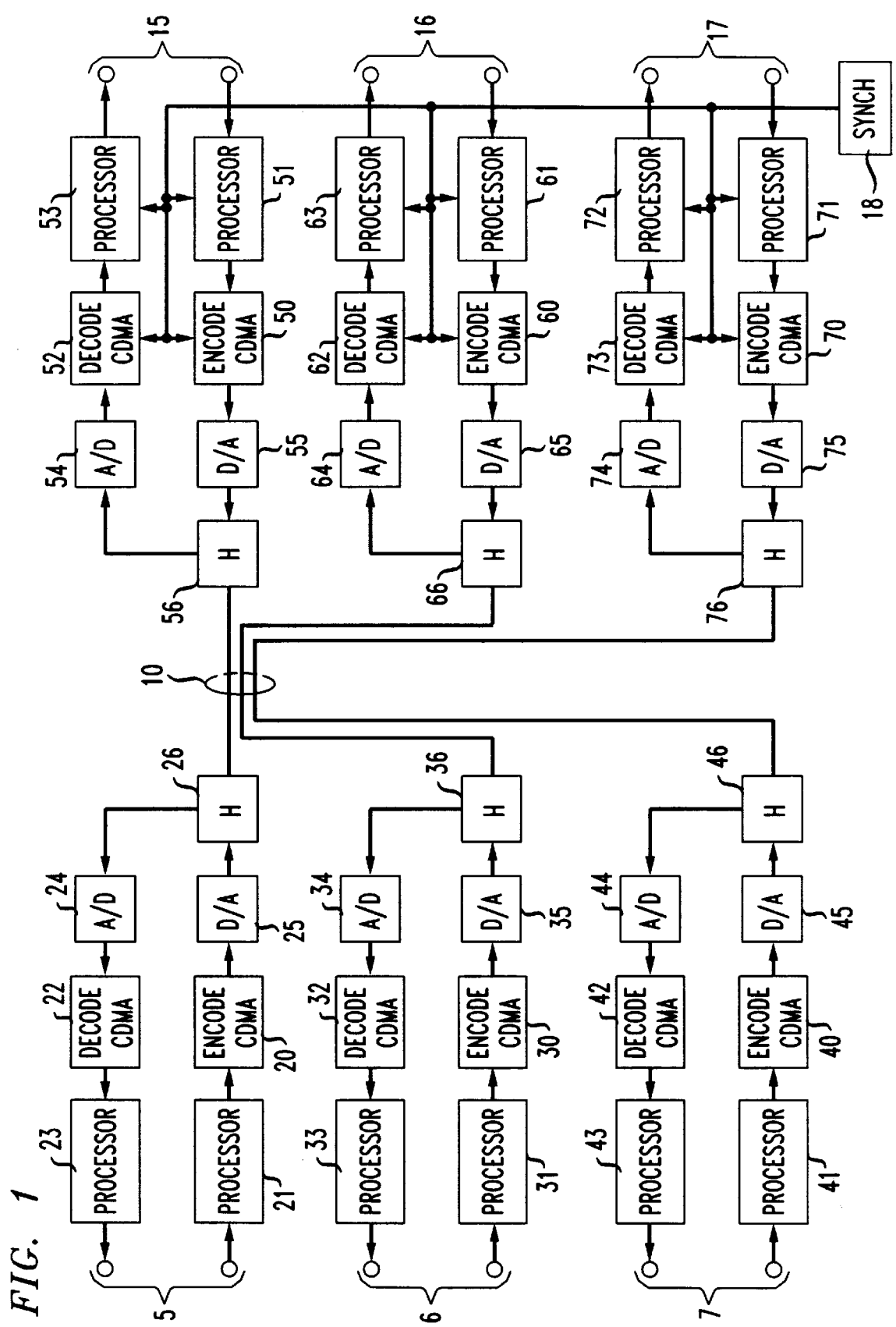
FIG. 1 presents an illustrative block diagram in conformance with the principles disclosed herein.

FIG. 1 illustrates the contemplated arrangement which, by way of example, employs CDMA. Element 10 is a cable that comprises a multiple number of wire pairs. Element 21 is a pre-encoding processor that is responsive to input signals of port 5. The output of element 21 is applied to CDMA encoder 20 and, thereafter, to D/A converter 25. The output of converter 25 is applied to a wire pair of element 10 via hybrid 26. Signals destined to port 5 arrive at hybrid 26 and are directed to A/D converter 24. The output of converter 24 is applied to CDMA decoder 22, and the output of decoder 22 is applied to post-decoding processor 23. The elements that interface cable 10 to other ports are illustratively identical to the ones described in connection with port 5, and bear correspondingly similar designations.

Figure 2:
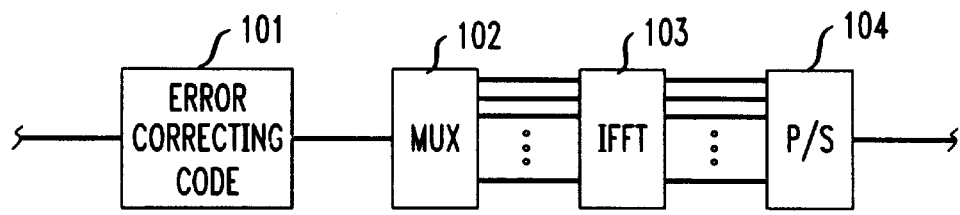
FIG. 2 is an illustrative block diagram of functions performed in processor 21.

The signal applied to processor 21 may be an analog signal, or it may be a digital signal. If intended to handle analog signals, processor 21 includes an A/D converter. Typically, the digital signal that is applied to the CDMA encoder is not a simple stream of bits (though it could be) but, rather, a steam of bit groupings. An illustrative example may be a digital stream that may be created for a DMT system, and this is illustrated in FIG. 2. Therein, a bit stream is applied to block 101 which injects error correcting bits (e.g., Reed Solomon encoder) and the resulting bit stream is divided into groups of bits that are multiplexed by block 102 to inverse fast Fourier transform (IFFT) processor 103. In accordance with the teachings of DMT modulation, the number of bits in a group that is applied to a particular input of the IFFT is a function of the expected signal-to-noise ratio in the frequency sub-channel that corresponds to that input (one might choose, for example, 256 sub-channels). The outputs of the IFFT processor form digitized time samples which are demultiplexed in parallel-to-serial converter 104 and applied to encoder 20 of FIG. 1.

Encoder 20 encodes, or modulates, the incoming signal (in CDMA, this is typically referred to as "spreading") with a code $C_{21}$ and applies the modulated signal onto a wire pair of cable 10.

Figure 3:
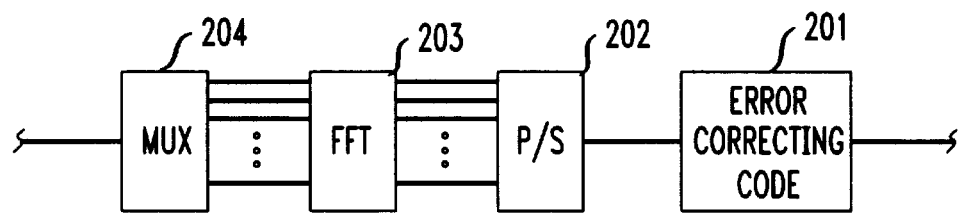
FIG. 3 is an illustrative block diagram of functions performed in processor 53.

At the receiving end, the signal appearing at decoder 52 is decoded, or demodulated, (in CDMA, this is typically referred to as "despreading") with the aid of code $C_{52}$ and applied to post-decoding processor 53. Processor 53 performs the inverse function of processor 21 and thereby recovers the signal sent by port 5. When processor 21 has the structure of FIG. 2, processor 53 might be constructed as shown in FIG. 3. Specifically, the incoming signal is applied to multiplexer 204, the outputs of multiplexer 204 are applied to FFT processor 203, and the outputs of FFT processor 203 are demulitplexed in parallel-to-serial converter 202. The output of converter 202 is applied to error correcting block 201 and, thus, the output to port 15 is generated.

The signals of other ports are handled similarly. For example, a signal on port 16 that is destined to port 6 applies its signal to pre-encoding processor 61, encoder 60 spreads the signal with code $C_{62}$ and applies the signal to a wire pair that belongs to cable 10.

It may be noted in passing that the apparatus attached to ports 5, 6, and 7 may in some applications be on premises of telecommunication customers, while the apparatus connected to ports 15, 16, and 17 may be on premises of the telecommunications provider, such as at a central office.

An important aspect of the FIG. 1 arrangement is that the encoding employed in connection with signals flowing in one wire pair is related to the encoding employed in connection with signals flowing in adjacent wire pairs in such a way that the encoding employed in the one wire pair is insensitive to signals of the adjacent wire pairs. This insensitivity may be realized by various means which can all be encompassed by the notion of orthogonality. In the FIG. 1 illustration, this is achieved by codes $C_{ij}$ being mutually orthogonal (where i=1,2,3,4 and j=1,2) and synchronized to each other. In other embodiments, the orthogonality can be achieved by time division multiplexing, frequency division multiplexing, etc. A mixture is also possible. Viewed another way, all wires in cable 10 can carry any and all signals as long as they are modulated to be mutually orthogonal. This includes, by the way, signals that are injected directly into a particular wire pair. Thus, for example, a wire pair can have two CDMA-modulated signals applied to it, and those signals can be completely separated from each other and from all other interfering signals as long they are modulated to be orthogonal to each other.

On the other hand, in actual situations of a cable having a number of wire pairs, not all wire pairs are adjacent to all other wire pairs. Interference from adjacent wire pairs may be assumed to be highly objectionable, but it is quite clear that at some physical separation of wire pairs within the same cable the interference merely adds to acceptable background noise. Consequently, not all of the wires in a cable of wires need to be encoded with mutually orthogonal modulation signals. A judicious selection of which CDMA code to be used in connection with which wire in a cable (if CDMA is the schema employed) can allow one family of mutually orthogonal codes to be used and reused in a cable that has many more wire pairs than there are members in the code family. This is reminiscent of frequency reuse in a cellular telephony environment.

In addition to the fact that not all wire pairs in a large cable need to be modulated with a mutually orthogonal signal, it should also be realized that the orthogonality requirement of this disclosure is, in a sense, quantitative. That is, a code pair may be sufficiently orthogonal (to each other) that within the tolerance requirements of the system (including, for example, the ability to recover errors through the error correction coding) the codes can be considered to be orthogonal. U.S. Pat. No. 5,461,610 issued Oct. 24, 1995 to Weerackody, for example, discloses an arrangement where, in an air interface situation, one can spread signals with codes that have been pre-coded and which are not completely orthogonal to each other, and the despreading is performed with the codes that are not pre-coded.

Hence, in the context of the claims appended hereto, the term "orthogonal" means "sufficiently orthogonal to create an interfering noise below a predetermined threshold."

In applications where ports 15, 16, and 17 are in a common location, the issue of synchronization is not difficult to resolve. A synch signal source within processor 18 in the common location synchronizes all of the local encoders, and the only question is how to synchronize the remote encoders. This may be accomplished by processors 51, 61, and 71, under control of processor 18, moving into a training mode and instructing the remaining processors to similarly enter a training mode. At that time, a known signal is sent by processor 51, and decoder 22, for example, adjusts the start of its CDMA code to maximize reception of the known signal. Once the start time for decoder 22 is set, the start time for encoder 20 is also set. The training mode can be instituted whenever the error rate increases above some given threshold, or at regular intervals, and the same procedure applies to all of the remote encoders and decoders. It is realized that to the extent that perfect synchronization is not maintained, it is not a fatal condition. It merely affects the level of orthogonality.

In connection with the above-mentioned observation that not all wire pairs in a cable need to have their own CDMA code, it makes sense to make the selection based on actually measured levels of interference. To that end, a provisioning session is employed, also under control of synch processor 18. In the provisioning session, synch processor 18 selects a wire pair, selects a first code of a set of codes, and sets one of the encoders of the selected wire pair to that code (e.g., encoder 50). The resulting interference levels (due to encoder 50) are measured by all of the post-decoding processors (to wit, processors 33, 43, 63 and 73 in FIG. 1), and the measured results are sent to synch processor 18. When the set of orthogonal CDMA codes consists of N codes, synch processor 18 identifies N post-decoding processors with the highest levels of interference (due to the signal of encoder 50), assigns a different code from the sent of N codes to the N−1 encoders that are associated with the post-decoding processors suffering from the highest levels of interference, and repeats the assignment of the selected code to the encoder that is associated with the post-decoding processor having the least amount of interference in the group of identified N post-decoding processors. The process then repeats until all encoders have an assigned code.

The code selection process can also be carried out on an ad hoc basis, when a need to assign a code to a wire pair arises. That is, it is quite possible that not all of the wire pairs in a cable will at any one time be used for carrying signals as described herein. At some points, then, a wire pair may be assigned to carry such signals and that would call for an assignment of a CDMA code to the wire pair. Synch processor 18 can observe the cross-talk signals received by the wire pair and, through correlation techniques, identify the CDMA code that presents the least interference. This code can then be selected as the CDMA code of the wire pair. The above suggests use of synch processor 18, but with processing power at the terminal ends of the wire pair, it is quite possible to assign the task of selecting a CDMA code to the local processor.

Figure 4:
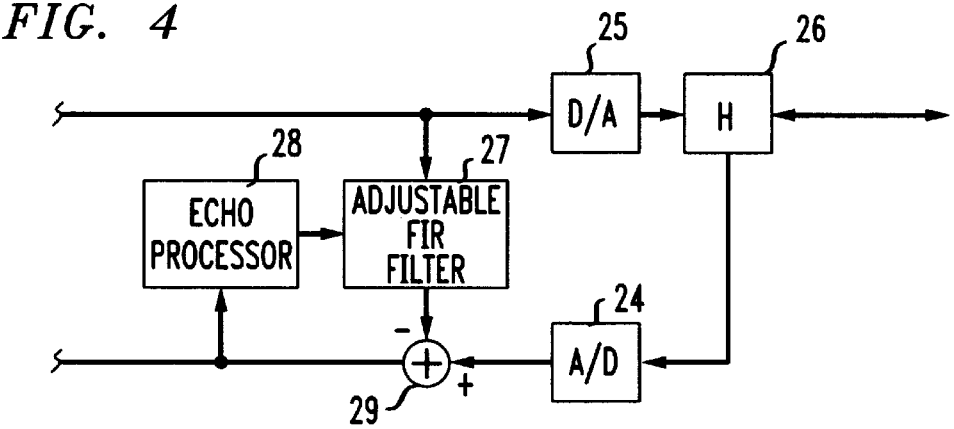
FIG. 4 presents a conventional embodiment of echo cancellation.

In the above description relating to the selection of codes, it may be noted that when a code was selected for encoder 50, processor 53 was not mentioned as being one of the places where the level of interference is measured. That is not because it is expected that there would be no interference but, rather, because it is expected that this interference can be reduced to a level where it does no harm. The interference generated by encoder 50 as measured at processor 53 is due to impedance mismatches at hybrids 26 and 56. However, the signal being sent to D/A converter 55 is known and, therefore, it can be subtracted out at the output of A/D converter 54. This is a classic echo cancellation problem, and FIG. 4 presents a conventional embodiment for performing that task. It includes an adjustable finite impulse response (FIR) filter 27 that emulates the echo paths (both near-end and far-end), an echo processor 28 that controls filter 27, and element 29 that subtracts the output of filter 27 from the output of A/D converter 24. The output of element 29 forms the input to echo processor 28. In applications where the echo cancellation is effective, the re-use of the CDMA codes is enhanced because, for example, if interference from a given code used in encoder 50 is not a problem for decoder 52, then encoder 20 may use the same code as is used by encoder 50.

Figure 5:
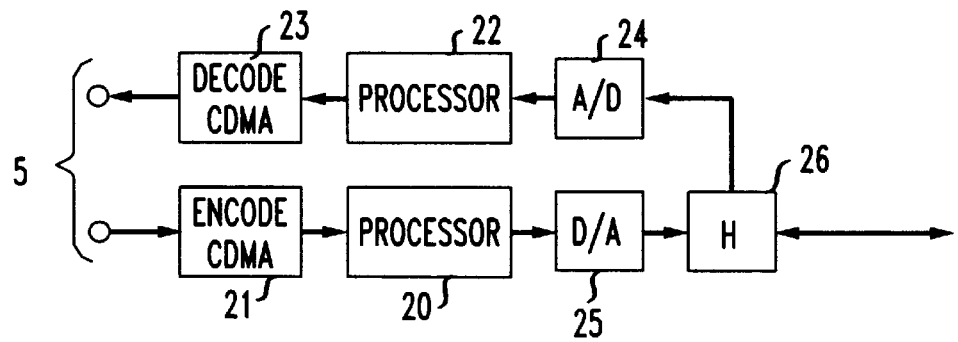
FIG. 5 presents a reverse-order arrangement of the arrangement shown in FIG. 1.

FIG. 1 illustrates an arrangement where processor 21 precedes CDMA encoder 20. Actually, that is not a requirement, and it is quite feasible to reverse the order—i.e, to have encoder 21 precede processor 20. This is illustrated in FIG. 5.

We claim:

1. In an arrangement comprising a bundle of non-coax wires, that contains a first wire and other wires in close proximity to said first wire such that significant electromagnetic interference can occur between said first wire and said other wires, said bundle of wires advancing signals from a first apparatus to a second apparatus that is remote from the first apparatus, a method of communicating an information signal through said first wire in proximity to said other wires that carry signals, comprising the steps of:

applying a modulation technique to the information signal to form a modulated signal, where the modulation technique is selected to create a first encoded signal that is orthogonal to signals carried in the other wires, and applying the modulated signal to the first wire.

2. The method of claim 1 where the modulation technique modulates the information signal with a first CDMA code.

3. The method of claim 2 further comprising the step of applying another signal on said first wire, which signal is modulated with a second CDMA code that is orthogonal to the first CDMA code.

4. The method of claim 2 where signals present in the other wires are signals that have been modulated with CDMA codes, and those codes are orthogonal to said first CDMA code.

5. The method of claim 1 where the information signal applied to the first wire is a wideband signal, where the signals in the other wires are wideband signals, and where the other wires are in such proximity to the first wire as to cause substantial electromagnetic coupling from the other wires.

6. The method of claim 1 where the other wires are in a cable that contains the first wire.

7. The method of claim 1 where the first wire and the other wires form a subset of wires in a cable of wires.

8. The method of claim 6 where the other wires are in a neighborhood of the first wire.

9. The method of claim 6 where the other wires are in close coupling proximity to the first wire.

10. The method of claim 8 where the cable contains still other wires that are not in close coupling proximity to the first wire, and one of those still other wires carries a signal that is modulated to form a second encoded signal that is not orthogonal to the first encoded signal.

11. The method of claim 1 where the signals carried in the other wires have been modulated with the same modulation technique as said information signal.

12. The method of claim 1 where the signals carried in the other wires have been modulated with a different modulation technique as said information signal.

13. The method of claim 1 where the step of applying said modulation technique to the information signal to form said first encoded signal is carried out at a first location, said first wire carries said first encoded signal to a second location, and the method further comprises a step of demodulating the first encoded signal.

14. The method of claim 13 where the first location is a customer premises and the second location is at the premises of a communication network provider.

15. The method of claim 1 where the step of applying a modulation technique to the information signal is preceded by a step of processing the information signal to increase ability to recover information in the presence of interfering noise.

16. The method of claim 1 where the step of applying a modulation technique to the information signal is succeeded by a step of processing the first encoded signal to increase ability to recover information in the presence of interfering noise.

17. The method of claim 1 wherein the step of applying applies the modulated signal to the first wire through a hybrid which includes a port for receiving a signal from the first wire and for excluding from this port the modulated signal applied to the first wire through said hybrid.

18. The method of claim 17, where the modulated signal of said step of applying a modulation technique to the information signal forms a first modulated signal, the method further comprising the steps of:

receiving at the hybrid, from the first wire, a second modulated signal, forming a received signal at said hybrid port; and removing from said received signal an echo signal that is derived from said first modulated signal.

19. The method of claim 18 where the step of removing comprises subtracting from the received signal a signal that is derived from passing the first modulated signal through an adjustable finite impulse response filter, forming thereby an echo canceled signal.

20. The method of claim 19 where the finite impulse response filter is adjusted with an equalization step which minimizes the level of said first modulated signal from said echo canceled signal.

* * * * *